United States Patent
Lin et al.

(10) Patent No.: US 10,237,166 B2
(45) Date of Patent: Mar. 19, 2019

(54) TOPOLOGICAL LEARNING METHOD AND APPARATUS FOR OPENFLOW NETWORK CROSS CONVENTIONAL IP NETWORK

(71) Applicant: Huawei Technologies Co., Ltd., Shenzhen (CN)

(72) Inventors: Ke Lin, Shenzhen (CN); Chenji Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 15/639,791

(22) Filed: Jun. 30, 2017

(65) Prior Publication Data
US 2017/0302562 A1 Oct. 19, 2017

Related U.S. Application Data

(63) Continuation of application No. PCT/CN2014/096052, filed on Dec. 31, 2014.

(51) Int. Cl.
*H04L 12/751* (2013.01)
*H04L 29/06* (2006.01)
(Continued)

(52) U.S. Cl.
CPC .............. *H04L 45/08* (2013.01); *H04L 29/06* (2013.01); *H04L 45/02* (2013.01); *H04L 49/60* (2013.01); *H04L 45/64* (2013.01)

(58) Field of Classification Search
CPC ......... H04L 45/08; H04L 49/60; H04L 45/02; H04L 29/06; H04L 45/64
See application file for complete search history.

(56) References Cited

U.S. PATENT DOCUMENTS

2013/0318243 A1* 11/2013 Chinthalapati ......... H04L 45/24
709/226
2014/0149542 A1* 5/2014 Luo ......................... H04L 45/02
709/217
(Continued)

FOREIGN PATENT DOCUMENTS

CN 102546351 A 7/2012
CN 103152264 A 6/2013
(Continued)

OTHER PUBLICATIONS

Machine Translation and Abstract of Chinese Publication No. CN103905523, Jul. 2, 2014, 10 pages.
(Continued)

*Primary Examiner* — Walli Z Butt
(74) *Attorney, Agent, or Firm* — Conley Rose, P.C.

(57) ABSTRACT

A topological learning method and apparatus for an OPEN-FLOW network cross a conventional Internet Protocol (IP) network. The method includes obtaining, by a controller, M OPENFLOW switch (OFS) ports connected to a same conventional IP network, determining whether there is a logical switch corresponding to the conventional IP network, if the controller determines that there is no logical switch corresponding to the conventional IP network, creating and storing the information about the logical switch, where the information about the logical switch includes related information of the M OFS ports, and related information of each OFS port includes link information in a direction from the port to the logical switch and/or link information in a direction from the logical switch to the port, and managing, by the controller, the logical switch as a common OPENFLOW switch of an OPENFLOW network.

20 Claims, 7 Drawing Sheets

(51) Int. Cl.
*H04L 12/931* (2013.01)
*H04L 12/715* (2013.01)

(56) References Cited

U.S. PATENT DOCUMENTS

| | | | |
|---|---|---|---|
| 2015/0003291 A1* | 1/2015 | Oikawa | H04L 61/6022 370/254 |
| 2015/0043382 A1* | 2/2015 | Arora | H04L 41/082 370/254 |
| 2015/0263888 A1* | 9/2015 | Hallivuori | H04L 41/0803 709/226 |
| 2015/0350077 A1* | 12/2015 | Durrani | H04L 45/745 709/225 |
| 2016/0080254 A1 | 3/2016 | Zhou et al. | |
| 2016/0218917 A1* | 7/2016 | Zhang | H04L 49/35 |

FOREIGN PATENT DOCUMENTS

| | | |
|---|---|---|
| CN | 103259728 A | 8/2013 |
| CN | 103905523 A | 7/2014 |
| CN | 104202266 A | 12/2014 |
| WO | 2014082589 A1 | 6/2014 |

OTHER PUBLICATIONS

Machine Translation and Abstract of Chinese Publication No. CN104202266, Dec. 10, 2014, 13 pages.
"OpenFlow Table Type Patterns," Version No. 1.0, ONF TS-017, Open Networking Foundation, Aug. 15, 2014, 55 pages.
Foreign Communication From a Counterpart Application, PCT Application No. PCT/CN2014/096052, English Translation of International Search Report dated Sep. 11, 2015, 2 pages.
Foreign Communication From a Counterpart Application, PCT Application No. PCT/CN2014/096052, English Translation of Written Opinion dated Sep. 11, 2015, 6 pages.
Machine Translation and Abstract of Chinese Publication No. CN102546351, Jul. 4, 2012, 16 pages.
Machine Translation and Abstract of Chinese Publication No. CN103152264, Jun. 12, 2013, 26 pages.
Foreign Communication From a Counterpart Application, Chinese Application No. 201480038255.5, Chinese Office Action dated Sep. 18, 2018, 5 pages.

* cited by examiner

TOPOLOGICAL LEARNING METHOD AND APPARATUS FOR OPENFLOW NETWORK CROSS CONVENTIONAL IP NETWORK

CROSS-REFERENCE TO RELATED APPLICATIONS

This application is a continuation of International Application No. PCT/CN2014/096052, filed on Dec. 31, 2014, the disclosure of which is hereby incorporated by reference in its entirety.

TECHNICAL FIELD

Embodiments of the present disclosure relate to communications technologies, and in particular, to a topological learning method and apparatus for an OPENFLOW network cross a conventional Internet Protocol (IP) network.

BACKGROUND

An OPENFLOW network includes a controller and multiple OPENFLOW switches (OFS), and one controller manages multiple OFSs. For example, a controller formulates, based on a view of an entire network, a routing policy for an OFS, and the OFS performs data forwarding and processing according to the routing policy sent by the controller. In comparison with an existing conventional IP network, the OPENFLOW network has advantages such as easy to manage and easy to maintain. However, considering costs, currently, OPENFLOW networks are mainly deployed inside a data center in a concentrated manner, and work collaboratively with the conventional IP network by means of interconnection.

In networking in which an OPENFLOW network and a conventional IP network are interconnected, a controller cannot perform topological learning that is between OFSs in the OPENFLOW network through the conventional IP network. Therefore, generally, configuration of a topology of the OPENFLOW network cross the conventional IP network is completed manually. However, topological learning efficiency of the OPENFLOW network cross the conventional IP network is not high.

SUMMARY

Embodiments of the present disclosure provide a topological learning method and apparatus for an OPENFLOW network cross a conventional IP network to improve topological learning efficiency of an OPENFLOW network cross a conventional IP network.

According to a first aspect, an embodiment of the present disclosure provides a topological learning method for an OPENFLOW network cross a conventional IP network, including obtaining, by a controller, M OPENFLOW switch OFS ports connected to a same conventional IP network, where M is an integer greater than or equal to 2, the conventional IP network includes a non-OFS, and the conventional IP network does not include an OFS, determining, by the controller, whether there is a logical switch corresponding to the conventional IP network, where information about the logical switch includes related information of at least one OFS port among the M OFS ports, and if the controller determines that there is no logical switch corresponding to the conventional IP network, creating and storing the information about the logical switch, where the information about the logical switch includes related information of the M OFS ports, where related information of each OFS port includes link information in a direction from the port to the logical switch and/or link information in a direction from the logical switch to the port.

With reference to the first aspect, in a first possible implementation manner of the first aspect, the method further includes if the controller determines that there is a logical switch corresponding to the conventional IP network, updating the information about the logical switch, where the updated information about the logical switch includes the related information of the M OFS ports.

With reference to the first aspect, in a second possible implementation manner of the first aspect, the creating and storing the information about the logical switch includes creating and storing, by the controller, link information between the M OFS ports and the logical switch according to sending directions and receiving directions of the M OFS ports.

With reference to the first aspect or the first possible implementation manner or the second possible implementation manner of the first aspect, in a third possible implementation manner of the first aspect, the obtaining, by a controller, M OFS ports connected to a same conventional IP network includes controlling, by the controller, each OFS port in the OPENFLOW network to send a Link Layer Discovery Protocol (LLDP) message and a Broadcast Domain Discovery Protocol (BDDP) message, where the BDDP message and the LLDP message each carry an identifier of a sending port, and the identifier of the sending port can uniquely identify the sending port in the OPENFLOW network, and obtaining, by the controller, the M OFS ports connected to the same conventional IP network according to the identifier of the sending port that is carried in the BDDP message and the identifier of the sending port that is carried in the LLDP message, where the M OFS ports include a first port and M−1 second ports, and the first port receives BDDP messages sent by the second ports but does not receive LLDP messages sent by the second ports, or the M−1 second ports receive a BDDP message sent by the first port but do not receive an LLDP message sent by the first port.

With reference to the first aspect or the first possible implementation manner or the second possible implementation manner of the first aspect, in a fourth possible implementation manner of the first aspect, the obtaining, by a controller, M OFS ports connected to a same conventional IP network includes enabling, by the controller, a routing protocol on a third port connected to an IP router, and storing a correspondence between the third port and an IP address, learning, by the controller using the routing protocol, routing information of the IP router connected to the third port, obtaining, by the controller from the routing information, network segment information of routers connected to the IP router, determining, by the controller according to the correspondence between the third port and the IP address, a fourth port belonging to the network segment information, sending, by the controller, a User Datagram Protocol (UDP) message to the fourth port through the third port, where the UDP message includes a data path identifier and a port identifier of a switch that sends the UDP message, and if the controller determines that the fourth port receives the UDP message sent by the third port, determining that the third port and the fourth port are ports in the M OFS ports connected to the same conventional IP network.

With reference to any one of the first aspect or the first possible implementation manner to the third possible implementation manner of the first aspect, in a fifth possible implementation manner of the first aspect, after the creating and storing, by the controller, the information about the logical switch, the method further includes when the controller determines that there is a down port among the M OFS ports, deleting link information between the down port and the logical switch, or if the controller determines that all of the M OFS ports are down, deleting the information about the logical switch.

With reference to the first aspect, in a sixth possible implementation manner of the first aspect, after the creating and storing, by the controller, the information about the logical switch, the method further includes calculating, by the controller, a forwarding path according to link information between the M OFS ports and the logical switch, and when the logical switch is a first-hop switch on the forwarding path, using, by the controller, a second-hop switch on the forwarding path as the first-hop switch, and sending a flow entry to a switch on the forwarding path other than the logical switch, or when the logical switch is an intermediate-hop switch on the forwarding path, sending, by the controller, a flow entry to a switch on the forwarding path other than the logical switch, or when the logical switch is a last-hop switch on the forwarding path, using, by the controller, a penultimate-hop switch on the forwarding path as the last-hop switch, and forwarding a flow entry to a switch on the forwarding path other than the logical switch.

According to a second aspect, an embodiment of the present disclosure provides a topological learning apparatus for an OPENFLOW network cross a conventional IP network, where the topological learning apparatus for an OPENFLOW network cross a conventional IP network is deployed on a controller, and the apparatus includes an obtaining module, configured to obtain M OPENFLOW switch OFS ports connected to a same conventional IP network, where M is an integer greater than or equal to 2, the conventional IP network includes a non-OFS, and the conventional IP network does not include an OFS, a determining module, configured to determine whether there is a logical switch corresponding to the conventional IP network, where information about the logical switch includes related information of at least one OFS port among the M OFS ports, and a processing module, configured to if the determining module determines that there is no logical switch corresponding to the conventional IP network, create and store the information about the logical switch, where the information about the logical switch includes related information of the M OFS ports, where related information of each OFS port includes link information in a direction from the port to the logical switch and/or link information in a direction from the logical switch to the port.

With reference to the second aspect, in a first possible implementation manner of the second aspect, the processing module is further configured to if there is a logical switch corresponding to the conventional IP network, update the information about the logical switch, where the updated information about the logical switch includes the related information of the M OFS ports.

With reference to the second aspect, in a second possible implementation manner of the second aspect, the processing module is configured to create and store link information between the M OFS ports and the logical switch according to sending directions and receiving directions of the M OFS ports.

With reference to the second aspect or the first possible implementation manner or the second possible implementation manner of the second aspect, in a third possible implementation manner of the second aspect, the processing module is configured to control all OPENFLOW switch OFS ports in the OPENFLOW network to send an LLDP message and a BDDP message, where the BDDP message and the LLDP message each carry an identifier of a sending port, and the identifier of the sending port can uniquely identify the sending port in the OPENFLOW network, and obtain the M OFS ports connected to the same conventional IP network according to the identifier of the sending port that is carried in the BDDP message and the identifier of the sending port that is carried in the LLDP message, where the M OFS ports include a first port and M−1 second ports, and the first port receives BDDP messages sent by the second ports but does not receive LLDP messages sent by the second ports, or the M−1 second ports receive a BDDP message sent by the first port but do not receive an LLDP message sent by the first port.

With reference to the second aspect or the first possible implementation manner or the second possible implementation manner of the second aspect, in a fourth possible implementation manner of the second aspect, the processing module is configured to enable a routing protocol on a third port connected to an IP router, and store a correspondence between the third port and an IP address, learn, using the routing protocol routing information of the IP router connected to the third port, obtain, from the routing information, network segment information of routers connected to the IP router, determine, according to the correspondence between the third port and the IP address, a fourth port belonging to the network segment information, send a UDP message to the fourth port through the third port, where the UDP message includes a data path identifier and a port identifier of a switch that sends the UDP message, and if the fourth port receives the UDP message sent by the third port, determine that the third port and the fourth port are ports in the M OFS ports connected to the same conventional IP network.

With reference to any one of the second aspect or the first possible implementation manner to the third possible implementation manner of the second aspect, in a fifth possible implementation manner of the second aspect, the processing module is further configured to when there is a down port among the M OFS ports, delete link information between the down port and the logical switch, or if all of the M OFS ports are down, delete the information about the logical switch.

With reference to the second aspect, in a sixth possible implementation manner of the second aspect, the processing module is further configured to calculate a forwarding path according to link information between the M OFS ports and the logical switch, and when the logical switch is a first-hop switch on the forwarding path, use a second-hop switch on the forwarding path as the first-hop switch, and send a flow entry to a switch on the forwarding path other than the logical switch, or when the logical switch is an intermediate-hop switch on the forwarding path, send a flow entry to a switch on the forwarding path other than the logical switch, or when the logical switch is a last-hop switch on the forwarding path, use a penultimate-hop switch on the forwarding path as the last-hop switch, and forward a flow entry to a switch on the forwarding path other than the logical switch.

According to a third aspect, an embodiment of the present disclosure provides a topological learning apparatus for an OPENFLOW network cross a conventional IP network, where the topological learning apparatus for an OPENFLOW network cross a conventional IP network is deployed on a controller, and the apparatus includes a communications interface, a memory, a processor, and a communications bus, where the communications interface, the memory, and the processor communicate using the communications bus, and the memory is configured to store a program, and the processor is configured to execute the program stored in the memory, and when the topological learning apparatus for an OPENFLOW network cross a conventional IP network operates, the processor runs the program, and the program includes obtaining M OFS ports connected to a same conventional IP network, where M is an integer greater than or equal to 2, the conventional IP network includes a non-OFS, and the conventional IP network does not include an OFS, determining whether the controller stores information about the logical switch, where the information about the logical switch includes related information of at least one OFS port among the M OFS ports, and if the controller does not store the information about the logical switch, creating and storing the information about the logical switch, where the information about the logical switch includes related information of the M OFS ports, where related information of each OFS port includes link information in a direction from the port to the logical switch and/or link information in a direction from the logical switch to the port.

According to the topological learning method and apparatus for an OPENFLOW network cross a conventional IP network provided in the embodiments of the present disclosure, a controller obtains M OFS ports connected to a same conventional IP network, and determines whether there is a logical switch corresponding to the conventional IP network, where information about the logical switch includes related information of at least one OFS port among the M OFS ports, if the controller determines that there is no logical switch corresponding to the conventional IP network, the controller creates and stores the information about the logical switch, where the information about the logical switch includes related information of the M OFS ports, and related information of each OFS port includes link information in a direction from the port to the logical switch and/or link information in a direction from the logical switch to the port, and the controller manages the logical switch as a common OPENFLOW switch of an OPENFLOW network. This improves topological learning efficiency of an OPENFLOW network cross a conventional IP network, and simplifies management by a controller cross a networking scenario in which an OPENFLOW network and a conventional IP network are interconnected.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
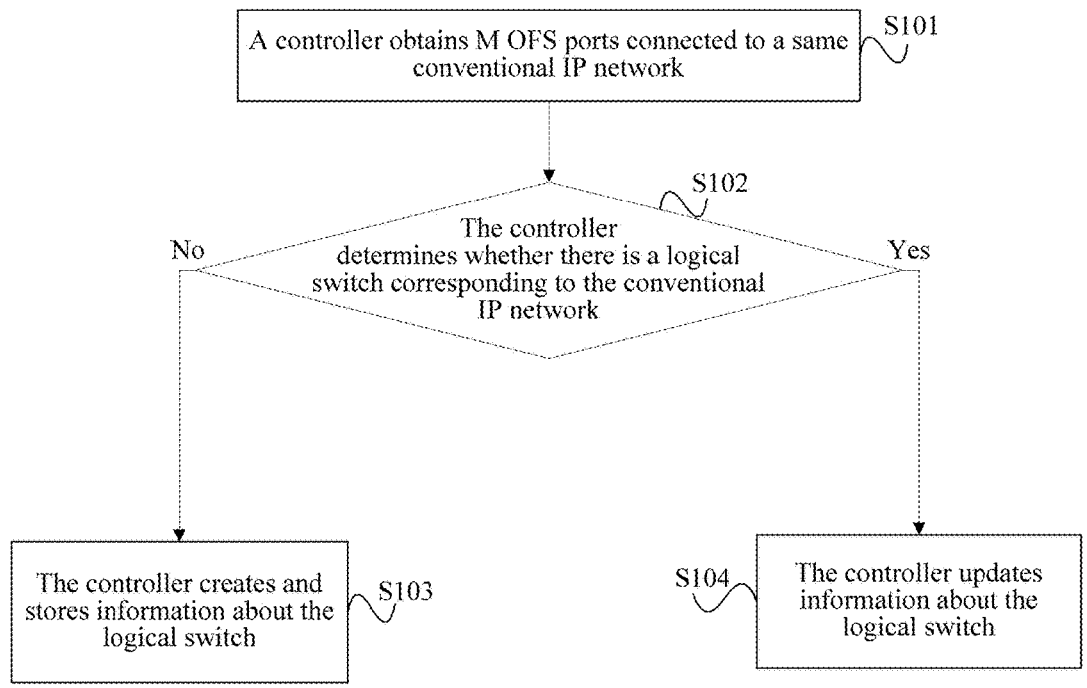
FIG. 1 is a schematic flowchart of an embodiment of a topological learning method for an OPENFLOW network cross a conventional IP network according to the present disclosure.

The following describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

The present disclosure is mainly applied to a networking scenario in which an OPENFLOW network and a conventional IP network are interconnected. The conventional IP network includes a non-OFS, and the conventional IP network does not include an OFS. In the OPENFLOW network, a controller centrally manages and controls ports of all OFSs, however, in the conventional IP network, the controller cannot control all switches of the conventional IP network. Therefore, the controller cannot learn a topological relationship among ports of the OPENFLOW network through the conventional IP network. To resolve the foregoing problems, in the present disclosure, the controller obtains M OFS ports connected to a same conventional IP network, the controller determines whether the controller stores information about a logical switch, where the information about the logical switch includes related information of at least one OFS port among the M OFS ports, and if the controller does not store information about the logical switch, the controller creates and stores information about the logical switch, where the information about the logical switch includes related information of the M OFS ports, and related information of each OFS port includes link information in a direction from the port to the logical switch and/or link information in a direction from the logical switch to the port. That is, a same conventional IP network is virtualized as a logical switch, a topological relationship of the OPENFLOW network cross the conventional IP network is learned by creating link information of each OFS port and the logical switch, and the controller manages the logical switch as a common switch of the OPENFLOW network. For example, the controller maintains a link and topological information and participates in calculation of a forwarding path, but does not deliver a flow entry to the logical switch. In this way, topological learning efficiency of an OPENFLOW network cross a conventional IP network can be improved, and management by a controller cross a networking scenario in which an OPENFLOW network and a conventional IP network are interconnected can be simplified.

Ports in each embodiment of the present disclosure refer to up ports of an OFS, that is, effective ports.

The following describes in detail technical solutions in the present disclosure using specific embodiments. The following specific embodiments may be combined with one another, and for a same or similar concept or process, details may not be described in some embodiments.

FIG. 1 is a schematic flowchart of an embodiment of a topological learning method for an OPENFLOW network cross a conventional IP network according to the present disclosure. This embodiment is performed by a controller of an OPENFLOW network. As shown in FIG. 1, the method of this embodiment is as follows:

S101: The controller obtains M OFS ports connected to a same conventional IP network.

M is an integer greater than or equal to 2.

In different scenarios, the controller may obtain, in different manners, the M OFS ports connected to the same conventional IP network in the OPENFLOW network.

S102: The controller determines whether there is a logical switch corresponding to the conventional IP network.

Information about the logical switch includes related information of at least one OFS port among the M OFS ports. A conventional IP network is virtualized as a logical switch.

Related information of each OFS port includes link information in a direction from the port to the logical switch and/or link information in a direction from the logical switch to the port.

If the controller determines that there is no logical switch corresponding to the conventional IP network, S103 is performed, or if the controller determines that there is a logical switch corresponding to the conventional IP network, S104 is performed.

S103: The controller creates and stores information about the logical switch.

The information about the logical switch includes related information of the M OFS ports.

S104: The controller updates information about the logical switch.

The updated information about the logical switch includes the related information of the M OFS ports.

According to this embodiment, a controller obtains M OFS ports connected to a same conventional IP network, and determines whether there is a logical switch corresponding to the conventional IP network, where information about the logical switch includes related information of at least one OFS port among the M OFS ports, if the controller determines that there is no logical switch corresponding to the conventional IP network, the controller creates and stores the information about the logical switch, where the information about the logical switch includes related information of the M OFS ports, and related information of each OFS port includes link information in a direction from the port to the logical switch and/or link information in a direction from the logical switch to the port, and the controller manages the logical switch as a common OPENFLOW switch of an OPENFLOW network. This improves topological learning efficiency of an OPENFLOW network cross a conventional IP network, and simplifies management by a controller cross a networking scenario in which an OPENFLOW network and a conventional IP network are interconnected.

The following describes the technical solutions in the present disclosure using different scenarios. Persons skilled in the art may understand that when networking is a combination of the different scenarios, the following technical solutions may be used adaptively in combination. When the networking is a combination of the different scenarios, details are not described in the present disclosure.

Figure 2:
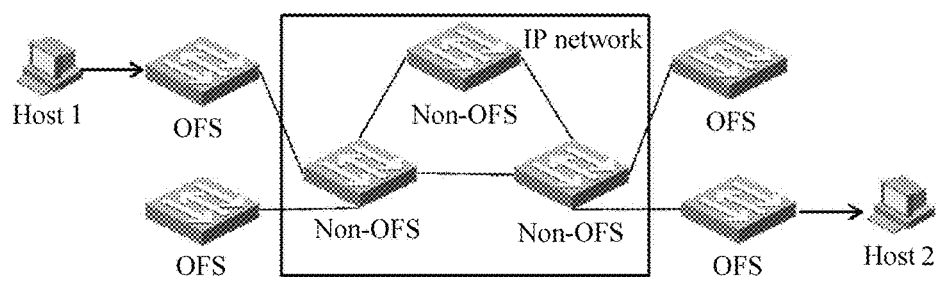
FIG. 2 is a schematic diagram of a first application scenario according to the present disclosure.
Figure 3:
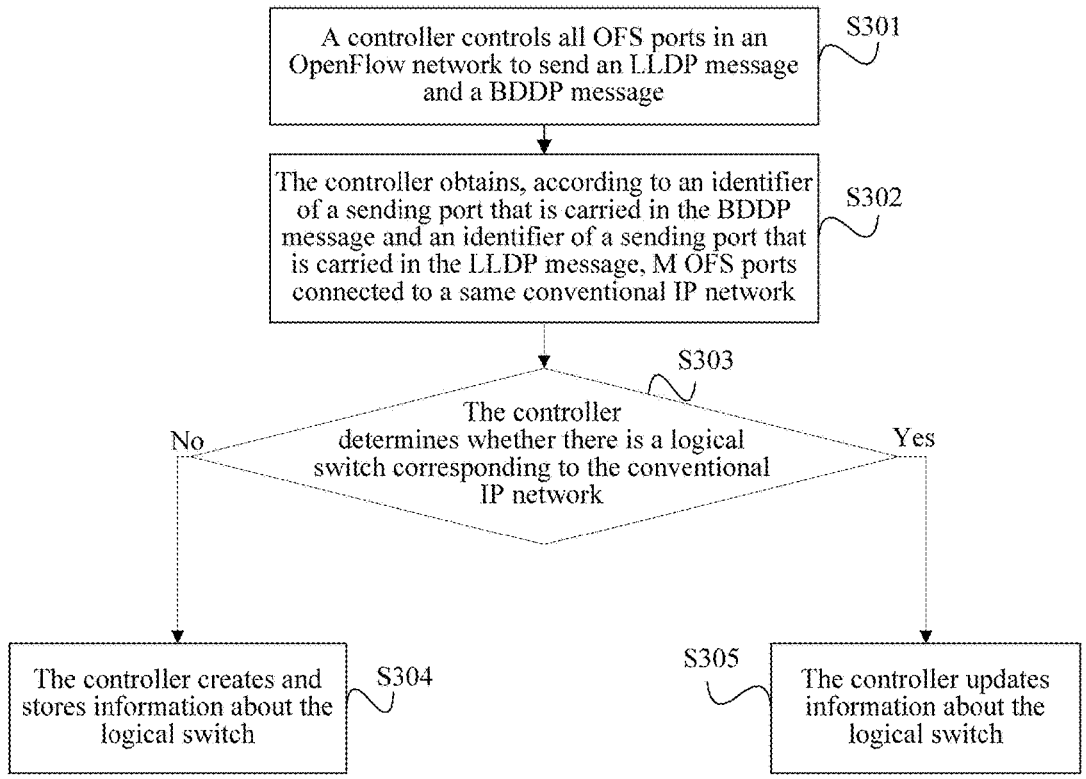
FIG. 3 is a schematic flowchart of an embodiment of a topological learning method for an OPENFLOW network cross a conventional IP network according to the present disclosure.

FIG. 2 is a schematic diagram of a first application scenario according to the present disclosure. As shown in FIG. 2, a switch of an OPENFLOW network is connected to a switch of a conventional IP network. For the scenario shown in FIG. 2, a method in the present disclosure is shown in FIG. 3. FIG. 3 is a schematic flowchart of an embodiment of a topological learning method for an OPENFLOW network cross a conventional IP network according to the present disclosure. As shown in FIG. 3, the method of this embodiment is as follows:

S301: A controller controls each OFS port in an OPENFLOW network to send an LLDP message and a BDDP message.

The BDDP message and the LLDP message each carry an identifier of a sending port, and the identifier of the sending port can uniquely identify the sending port in the OPENFLOW network. For example, the identifier of the sending port may be an identifier of an OFS at which the sending port is located and a port number of the sending port. The LLDP message can be transmitted between devices that are one hop away from each other. After receiving the LLDP message, the switch of the conventional IP network does not further forward the message. However, the BDDP message is a broadcast message, and after receiving the BDDP message, the switch of the conventional IP network further forwards the message.

S302: The controller obtains, according to an identifier of a sending port that is carried in the BDDP message and an identifier of a sending port that is carried in the LLDP message, M OFS ports connected to a same conventional IP network.

The M OFS ports include a first port and M−1 second ports, and the first port receives BDDP messages sent by the second ports but does not receive LLDP messages sent by the second ports, where M is an integer greater than or equal to 1. For example, if a port 1 of OFS-1 receives a BDDP message sent by a port 1 of OFS-2 but does not receive an LLDP message sent by the port 1 of OFS-2, and the port 1 of OFS-1 receives a BDDP message sent by a port 1 of OFS-3 but does not receive an LLDP message sent by the port 1 of OFS-3, the port 1 of OFS-1 is the first port, and both the port 1 of OFS-2 and the port 1 of OFS-3 are the second ports. The port 1 of OFS-1, the port 1 of OFS-2, and the port 1 of OFS-3 are three OFS ports connected to a same conventional IP network (a two-layer conventional IP network).

Alternatively, the M OFS ports include a first port and M−1 second ports, and the first port receives BDDP messages sent by the second ports but does not receive LLDP messages sent by the second ports, where R is an integer greater than or equal to 1. For example, if a port 1 of OFS-2 receives a BDDP message sent by a port 1 of OFS-1 but does not receive an LLDP message sent by the port 1 of OFS-1, and a port 1 of OFS-3 receives a BDDP message sent by the port 1 of OFS-1 but does not receive an LLDP message sent by the port 1 of OFS-1, the port 1 of OFS-1 is the first port, and both the port 1 of OFS-2 and the port 1 of OFS-3 are the second ports. The port 1 of OFS-1, the port 1 of OFS-2, and the port 1 of OFS-3 are three OFS ports connected to a same conventional IP network (a two-layer conventional IP network).

The first port described in this embodiment refers to that a port is referred to as the first port when the port implements a function of a receiving port and satisfies the conditions described in the previous paragraph. The second port refers to that a port is referred to as the second port when the port implements a function of a sending port and satisfies the conditions described in the previous paragraph. It may be understood that a same port may be the first port, or may be the second port at the same time.

S303: The controller determines whether there is a logical switch corresponding to the conventional IP network.

Information about the logical switch includes related information of at least one OFS port among the M OFS ports.

If the controller determines that there is no logical switch corresponding to the conventional IP network, S304 is performed, or if the controller determines that there is a logical switch corresponding to the conventional IP network, S305 is performed.

S304: The controller creates and stores information about the logical switch.

Link information between the M OFS ports and the logical switch is created and stored according to sending directions and receiving directions of the M OFS ports. In an embodiment, link information of a receiving direction of the first port and link information of a sending direction of the second port are created.

The information about the logical switch includes related information of the first port and related information of the second port. The related information of the first port includes link information in a direction from the logical switch to the first port, and the related information of the second port includes link information in a direction from the second port to the logical switch.

S305: The controller updates information about the logical switch.

The updated information about the logical switch includes related information of the M OFS ports.

In one embodiment, it is assumed that the logical switch includes related information of T OFS ports among the M OFS ports, and for this, there are cases as follows. When the T OFS ports include the first port, and the related information of the first port does not include the link information in the direction from the logical switch to the first port, the link information in the direction from the logical switch to the first port is created. When the T OFS ports include the second port, and the related information of the second port does not include the link information in the direction from the second port to the logical switch, the link information in the direction from the second port to the logical switch is created, and related information of ports among the M OFS ports except the T OFS ports is created and stored. For ports, belonging to the first port, of the ports among the M OFS ports except the T OFS ports, the link information in the direction from the logical switch to the first port is created, and for ports belonging to the second port, the link information in the direction from the second port to the logical switch is created.

Figure 4:
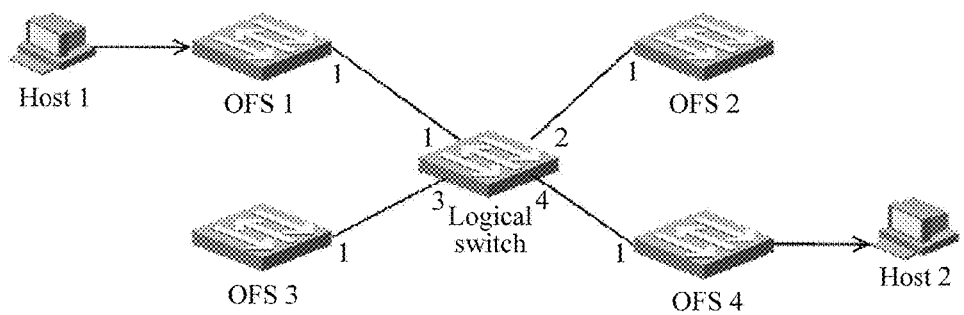
FIG. 4 is a schematic diagram of a topological learning effect in a first scenario according to the present disclosure.

Using the method shown in FIG. 3, a topological relationship after learning in the scenario shown in FIG. 2 is shown in FIG. 4. FIG. 4 is a schematic diagram of a topological learning effect in a first scenario according to the present disclosure.

Each logical switch maintains a table of mappings between ports of the logical switch and ports of the OPEN-FLOW network, and manages link information between the logical switch and each port of the OPENFLOW network, as shown in Table 1.

TABLE 1

Link information relationship table maintained by a logical switch

| Logical switch | Management port | Number of the logical switch | Port number of an OPENFLOW network |
|---|---|---|---|
| Logical switch 1 | SW1-Port1 | 1 | SW1-Port1 |
| | | 2 | SW2-Port1 |
| | | 3 | SW3-Port1 |
| | | 4 | SW4-Port1 |

"SWi-Portj" represents a $j^{th}$ OFS port of a switch i of the OPENFLOW network.

A port, of the OPENFLOW network, that creates a logical switch is responsible for managing the logical switch, and updates in real time learned port information of the OPEN-FLOW network. When the port, of the OPENFLOW network, that is responsible for managing the logical switch is down, a port is re-selected from other ports of the OPEN-FLOW network connected to the logical switch, to manage the logical switch. When all ports of the OPENFLOW network that are connected to the logical switch are down, the logical switch is deleted. Alternatively, when the controller determines that there is a down port among the M ports in the foregoing embodiments, link information between the down port and the logical switch is deleted. When the controller determines that all of the M OFS ports are down, the information about the logical switch is deleted.

Figure 5:
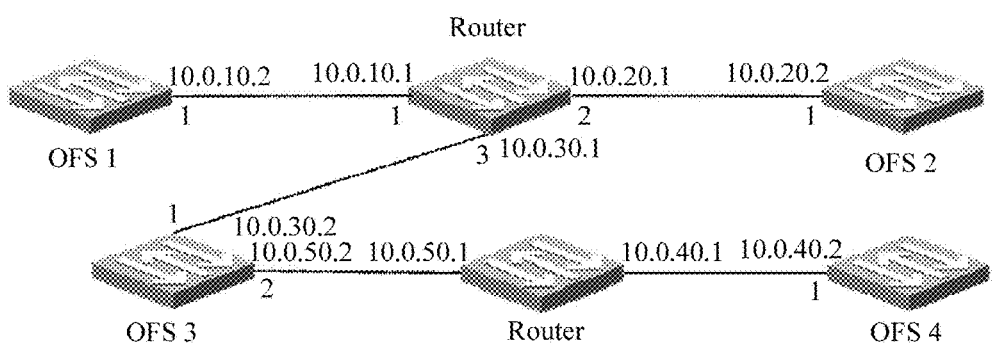
FIG. 5 is a schematic diagram of a second application scenario according to the present disclosure.
Figure 6:
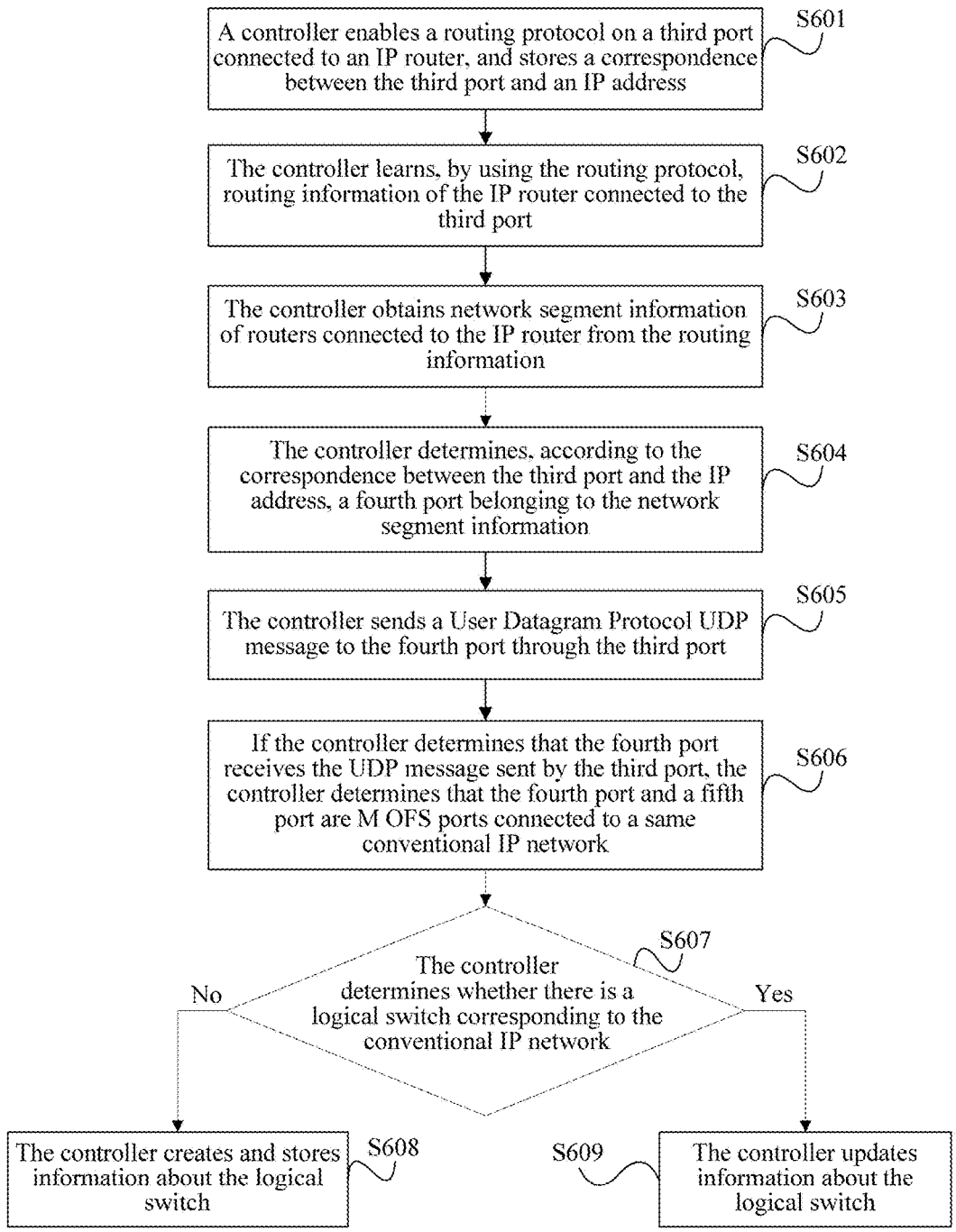
FIG. 6 is a schematic flowchart of an embodiment of a topological learning method for an OPENFLOW network cross a conventional IP network according to the present disclosure.

FIG. 5 is a schematic diagram of a second application scenario according to the present disclosure. As shown in FIG. 5, a switch of an OPENFLOW network is connected to a router of a conventional IP network. For the scenario shown in FIG. 5, a method in the present disclosure is shown in FIG. 6. FIG. 6 is a schematic flowchart of an embodiment of a topological learning method for an OPENFLOW network cross a conventional IP network according to the present disclosure. As shown in FIG. 6, the method of this embodiment is as follows:

S601: A controller enables a routing protocol on a third port connected to an IP router, and stores a correspondence between the third port and an IP address.

The correspondence is shown in Table 2:

TABLE 2

Correspondence between a third port and an IP address

| Third port | IP address |
|---|---|
| SW1-Port1 | 10.0.10.2 |
| SW2-Port1 | 10.0.20.2 |
| SW3-Port1 | 10.0.30.2 |

TABLE 2-continued

Correspondence between a third port and an IP address

| Third port | IP address |
|---|---|
| SW3-Port1 | 10.0.50.2 |
| SW4-Port1 | 10.0.40.2 |

S602: The controller learns, using the routing protocol, routing information of the IP router connected to the third port.

After the routing protocol is enabled on the third port connected to the IP router, the IP router sends the routing information learned by the router to the third port.

S603: The controller obtains network segment information of routers connected to the IP router from the routing information.

For example, a port 1 of a switch (SW)1 learns routing information of network segments 10.0.20.0/24 and 10.0.30.0/24.

S604: The controller determines a fourth port belonging to the network segment information according to the correspondence between the third port and the IP address.

For example, if an IP address of SW2-Port1 is 10.0.20.2 and belongs to the network segment of 10.0.20.0/24, and an IP address of SW3-Port1 is 10.0.30.2 and belongs to the network segment of 10.0.30.0/24, SW2-Port1 and SW3-Port1 are fourth ports, and determining of other ports are similar thereto.

S605: The controller sends a UDP message to the fourth port through the third port.

The UDP message carries an identifier of the third port, and the identifier of the third port can uniquely identify the third port in the OPENFLOW network.

The UDP message includes a data path identifier and port information of a switch that sends the message, and a purpose for sending the UDP message is to probe accessibility of a path between the third port and the fourth port. For example, SW1-Port1 sends a UDP message to 10.0.20.2 and 10.0.30.2 to probe accessibility of SW2-Port1 and accessibility of SW3-Port1.

S606: If the controller determines that the fourth port receives the UDP message sent by the third port, the controller determines that the third port and the fourth port are M OFS ports connected to a same conventional IP network.

For example, if SW2-Port1 and SW3-Port1 receive the UDP message sent by SW1-Port1, it indicates that SW1-Port1, SW2-Port1, and SW3-Port1 are three OFS ports connected to the same conventional IP network (a three-layer conventional IP network).

S607: The controller determines whether there is a logical switch corresponding to the conventional IP network.

Information about the logical switch includes related information of at least one OFS port among the M OFS ports. If there is no logical switch corresponding to the conventional IP network, S608 is performed, or if there is a logical switch corresponding to the conventional IP network, S609 is performed.

S608: The controller creates and stores information about the logical switch.

Link information between the M OFS ports and the logical switch is created and stored according to sending directions and receiving directions of the M OFS ports. Link information of a receiving direction of the fourth port and link information of a sending direction of the third port are created.

The information about the logical switch includes related information of the third port and related information of the fourth port. The related information of the third port includes link information in a direction from the third port to the logical switch, and the related information of the fourth port includes link information in a direction from the logical switch to the third port.

S609: The controller updates information about the logical switch.

The updated information about the logical switch includes related information of the M OFS ports.

In an embodiment, it is assumed that the logical switch includes related information of T OFS ports among the M OFS ports, and for this, there are cases as follows. When the T OFS ports include the fourth port, and the related information of the fourth port does not include the link information in the direction from the logical switch to the fourth port, the link information in the direction from the logical switch to the fourth port is created. When the T OFS ports include the third port, and the related information of the third port does not include the link information in the direction from the third port to the logical switch, the link information in the direction from the third port to the logical switch is created, and related information of ports among the M OFS ports except the T OFS ports is created and stored. For ports, belonging to the fourth port, of the ports among the M OFS ports except the T OFS ports, the link information in the direction from the logical switch to the fourth port is created, and for ports belonging to the third port, the link information in the direction from the third port to the logical switch is created.

In this embodiment, a controller manages a logical switch as a common switch of an OPENFLOW network, such that topological learning efficiency of an OPENFLOW network cross a conventional IP network can be improved, and management by a controller cross a networking scenario in which an OPENFLOW network and a conventional IP network are interconnected can be simplified.

Figure 7:
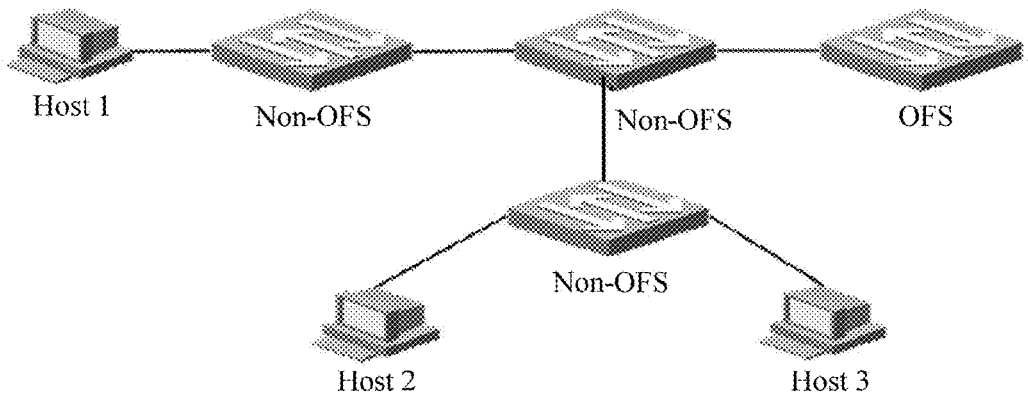
FIG. 7 is a schematic diagram of a third application scenario according to the present disclosure.
Figure 8:
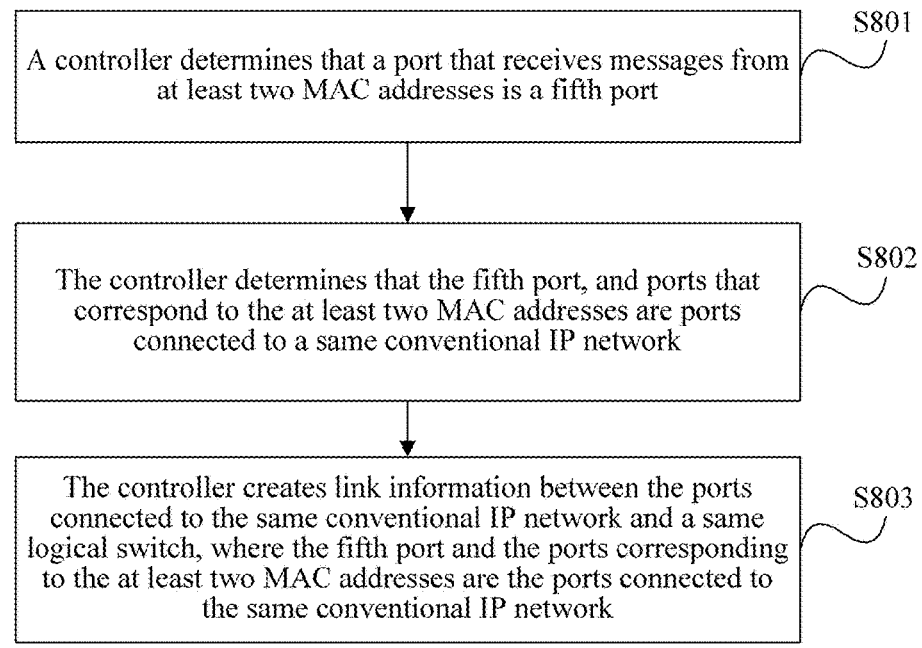
FIG. 8 is a schematic flowchart of an embodiment of a topological learning method for an OPENFLOW network cross a conventional IP network according to the present disclosure.

FIG. 7 is a schematic diagram of a third application scenario according to the present disclosure. As shown in FIG. 7, a host is connected to a switch of a conventional IP network. For the scenario shown in FIG. 7, a method in the present disclosure is shown in FIG. 8. FIG. 8 is a schematic flowchart of an embodiment of a topological learning method for an OPENFLOW network cross a conventional IP network according to the present disclosure. As shown in FIG. 8, the method of this embodiment is as follows:

S801: A controller determines that a port that receives messages from at least two Media Access Control (MAC) addresses is a fifth port.

When a same OFS port of one switch of the OPENFLOW network receives messages from at least two MAC addresses, it indicates that the port is connected to a switch of the conventional IP network.

S802: The controller determines that the fifth port, and ports that correspond to the at least two MAC addresses are ports connected to a same conventional IP network.

S803: The controller creates link information between the ports connected to the same conventional IP network and a same logical switch, where the fifth port and the ports corresponding to the at least two MAC addresses are the ports connected to the same conventional IP network.

That is, the controller mounts, on a logical switch, the fifth port and a host that corresponds to the at least two MAC addresses.

Figure 9:
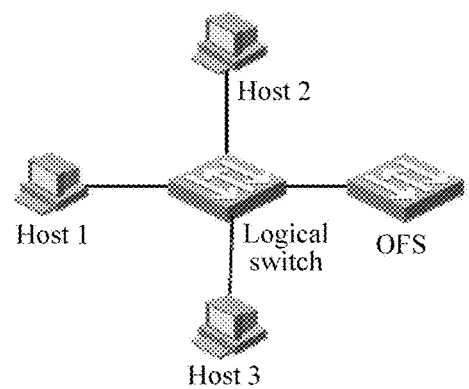
FIG. 9 is a schematic diagram of a topological learning effect in a third scenario according to the present disclosure.

Using the method shown in FIG. 8, a topological relationship after learning in the scenario shown in FIG. 7 is shown in FIG. 9. FIG. 9 is a schematic diagram of a topological learning effect in a third scenario according to the present disclosure.

In the foregoing embodiments, a controller creates a logical switch, and after creating and storing information about the logical switch, the controller manages the logical switch as a common switch of an OPENFLOW network. For example, when the controller calculates a forwarding path according to link information between M OFS ports and the logical switch, the logical switch participates in calculation of the forwarding path as a common OPENFLOW switch does, but does not deliver a flow entry to a logical switch on the forwarding path. The logical switch may perform forwarding as a first switch, an intermediate-hop switch, or a last switch on the forwarding path according to a location of the logical switch on the entire forwarding path.

Figure 10:
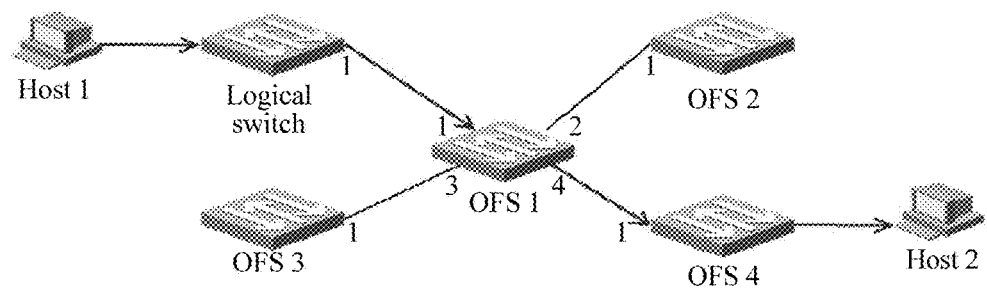
FIG. 10 is a schematic diagram of a scenario in which a logical switch is a first-hop switch according to the present disclosure.

A scenario in which the logical switch is a first-hop switch on the forwarding path is shown in FIG. 10. FIG. 10 is a schematic diagram of the scenario in which the logical switch is the first-hop switch according to the present disclosure. The controller uses a second-hop switch on the forwarding path as the first-hop switch and delivers the flow entry to the second-hop switch, and sends the flow entry to a switch on the forwarding path other than the logical switch. The controller does not deliver the flow entry to the logical switch.

Figure 11:
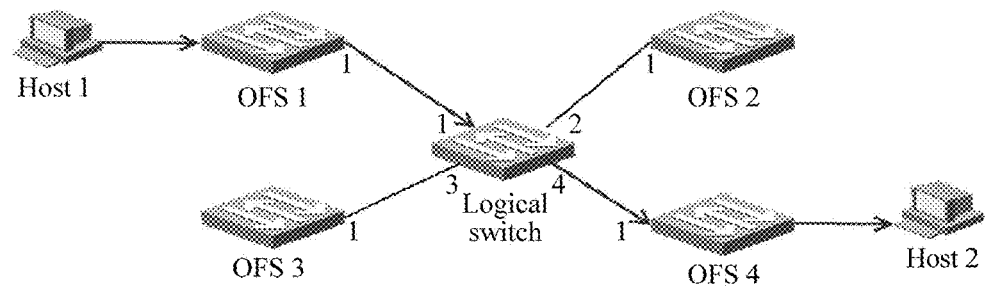
FIG. 11 is a schematic diagram of a scenario in which a logical switch is an intermediate-hop switch according to the present disclosure.

A scenario in which the logical switch is an intermediate-hop switch on the forwarding path is shown in FIG. 11. FIG. 11 is a schematic diagram of the scenario in which the logical switch is the intermediate-hop switch according to the present disclosure. The controller sends the flow entry to a switch on the forwarding path other than the logical switch.

Figure 12:
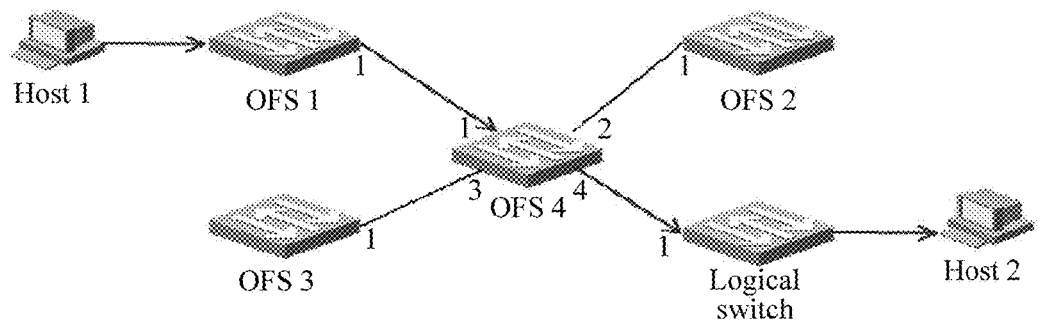
FIG. 12 is a schematic diagram of a scenario in which a logical switch is a last-hop switch according to the present disclosure.

A scenario in which the logical switch is a last-hop switch on the forwarding path is shown in FIG. 12. FIG. 12 is a schematic diagram of the scenario in which the logical switch is the last-hop switch according to the present disclosure. The controller uses a penultimate-hop switch on the forwarding path as the last-hop switch, and forwards the flow entry to a switch on the forwarding path other than the logical switch.

In conclusion, all the foregoing embodiments of the present disclosure can bring the following beneficial effects: implementation is simple, and topological learning and management of an OPENFLOW network cross a conventional IP network can be completed without a need of making any modification on the OPENFLOW Protocol. By creating and managing a virtual logical switch, a controller can simplify management on a link and topological information. When a forwarding path is calculated, a difference between an OPENFLOW switch and a switch of a conventional IP network is blocked, thereby simplifying calculation of the forwarding path cross the OPENFLOW network and an IP switch.

It should be noted that in the foregoing embodiments, when there is a case in which multiple newly created logical switches are connected to a same OFS port, the logical switches connected to the same OFS port are combined to be one logical switch. Generally, according to creation times, a logical switch created later is added to a logical switch created earlier. In an embodiment, information about the logical switch created later is modified, an identifier of the logical switch created later is modified to be an identifier of the logical switch created earlier, a port of the logical switch created later and a port of the logical switch created earlier are numbered sequentially, and link information of the logical switch created later is copied to information about the logical switch created earlier.

Figure 13:
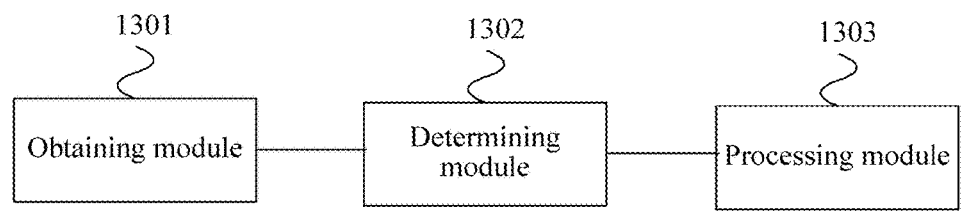
FIG. 13 is a schematic structural diagram of an embodiment a topological learning apparatus for an OPENFLOW network cross a conventional IP network according to the present disclosure.

FIG. 13 is a schematic structural diagram of an embodiment of a topological learning apparatus for an OPENFLOW network cross a conventional IP network according to the present disclosure. The apparatus of this embodiment may be deployed on a controller, and the apparatus of this embodiment includes an obtaining module 1301, a determining module 1302, and a processing module 1303. The obtaining module 1301 is configured to obtain M OFS ports connected to a same conventional IP network, where M is an integer greater than or equal to 2, and a switch of the conventional IP network is a non-OPENFLOW switch OFS, the conventional IP network comprises a non-OFS, and the conventional IP network does not comprise an OFS. The determining module 1302 is configured to determine whether there is a logical switch corresponding to the conventional IP network, where information about the logical switch includes related information of at least one OFS port among the M OFS ports. The processing module 1303 is configured to if the controller determines that there is no logical switch corresponding to the conventional IP network, create and store the information about the logical switch, where the information about the logical switch includes related information of the M OFS ports. Related information of each OFS port includes link information in a direction from the port to the logical switch and/or link information in a direction from the logical switch to the port.

In this embodiment, the processing module 1303 is further configured to if the determining module determines that there is a logical switch corresponding to the conventional IP network, update the information about the logical switch, where the updated information about the logical switch includes the related information of the M OFS ports.

In this embodiment, the processing module 1303 is configured to create and store link information between the M OFS ports and the logical switch according to sending directions and receiving directions of the M OFS ports.

In this embodiment, the processing module 1303 is configured to control all OPENFLOW switch OFS ports in the OPENFLOW network to send an LLDP message and a BDDP message, where the BDDP message and the LLDP message each carry an identifier of a sending port, and the identifier of the sending port can uniquely identify the sending port in the OPENFLOW network, and obtain the M OFS ports connected to the same conventional IP network according to the identifier of the sending port that is carried in the BDDP message and the identifier of the sending port that is carried in the LLDP message, where the M OFS ports include a first port and M−1 second ports, and the first port receives BDDP messages sent by the second ports but does not receive LLDP messages sent by the second ports, or the M−1 second ports receive a BDDP message sent by the first port but does not receive an LLDP message sent by the first port.

In this embodiment, the processing module 1303 is configured to enable a routing protocol on a third port connected to an IP router, and store a correspondence between the third port and an IP address, learn, using the routing protocol, routing information of the IP router connected to the third port, obtain, from the routing information, network segment information of routers connected to the IP router, determine, according to the correspondence between the third port and the IP address, a fourth port belonging to the network segment information, send a UDP message to the fourth port through the third port, where the UDP message includes a data path identifier and a port identifier of a switch that sends the UDP message, and if the fourth port receives the UDP message sent by the third port, determine that the third port and the fourth port are ports in the M OFS ports connected to the same conventional IP network.

In this embodiment, the processing module 1303 is further configured to when there is a down port among the M OFS ports, delete link information between the down port and the logical switch, or if all of the M OFS ports are down, delete the information about the logical switch.

In this embodiment, the processing module 1303 is further configured to calculate a forwarding path according to link information between the M OFS ports and the logical switch, and when the logical switch is a first-hop switch on the forwarding path, use a second-hop switch on the forwarding path as the first-hop switch, and send a flow entry to a switch on the forwarding path other than the logical switch, or when the logical switch is an intermediate-hop switch on the forwarding path, send a flow entry to a switch on the forwarding path other than the logical switch, or when the logical switch is a last-hop switch on the forwarding path, use a penultimate-hop switch on the forwarding path as the last-hop switch, and forward a flow entry to a switch on the forwarding path other than the logical switch.

According to the apparatus in this embodiment, the obtaining module 1301 obtains M OFS ports connected to a same conventional IP network, the determining module 1302 determines whether there is a logical switch corresponding to the conventional IP network, where information about the logical switch includes related information of at least one OFS port among the M OFS ports, if the determining module 1302 determines that there is no logical switch corresponding to the conventional IP network, the processing module 1303 creates and stores the information about the logical switch, where the information about the logical switch includes related information of the M OFS ports, and related information of each OFS port includes link information in a direction from the port to the logical switch and/or link information in a direction from the logical switch to the port, and the processing module 1303 manages the logical switch as a common OPENFLOW switch of an OPENFLOW network. This improves topological learning efficiency of an OPENFLOW network cross a conventional IP network, and simplifies management by a controller cross a networking scenario in which an OPENFLOW network and a conventional IP network are interconnected.

Figure 14:
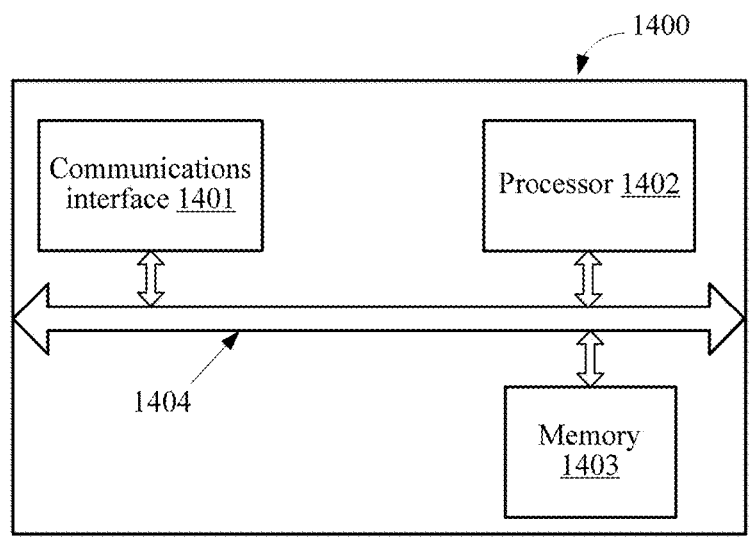
FIG. 14 is a schematic structural diagram of an embodiment of a topological learning apparatus for an OPENFLOW network cross a conventional IP network according to the present disclosure.

FIG. 14 is a schematic structural diagram of an embodiment of a topological learning apparatus for an OPENFLOW network cross a conventional IP network according to the present disclosure. The topological learning apparatus 1400 for an OPENFLOW network cross a conventional IP network includes a communications interface 1401, a memory 1403, and a processor 1402, where the communications interface 1401, the processor 1402, and the memory 1403 are connected with one another using a bus 1404. The bus 1404 may be a peripheral component interconnect (PCI) bus, an extended industry standard architecture (EISA) bus, or the like. The bus may be classified as an address bus, a data bus, a control bus, or the like. For ease of illustration, the bus is represented using only one bold line in FIG. 14, but this does not mean that there is only one bus or one type of bus.

The communications interface 1401 is configured to communicate with a transmit end. The memory 1403 is configured to store a program. In an embodiment, the program may include program code, where the program code includes a computer operation instruction. The memory 1403 may include a random access memory (RAM), or may further include a non-volatile memory, such as at least one magnetic disk storage. The processor 1402 executes the program stored in the memory 1403 to implement the methods in the foregoing method embodiments of the present disclosure, including obtaining M OFS ports connected to a same conventional IP network, where M is an integer greater than or equal to 2, and a switch of the conventional IP network is a non-OPENFLOW switch OFS, the conventional IP network comprises a non-OFS, and the conventional IP network does not comprise an OFS, determining whether the controller stores information about the logical switch, where the information about the logical switch includes related information of at least one OFS port among the M OFS ports, and if the controller does not store the information about the logical switch, creating and storing the information about the logical switch, where the information about the logical switch includes related information of the M OFS ports, where related information of each OFS port includes link information in a direction from the port to the logical switch and/or link information in a direction from the logical switch to the port.

The processor 1402 may be a general purpose processor, including a central processing unit (CPU), a network processor (NP), and the like, or may be a digital signal processor (DSP), an application-specific integrated circuit (ASIC), a field programmable gate array (FPGA), or another programmable logical device, discrete gate or transistor logic device, or discrete hardware assembly.

According to the apparatus in this embodiment, the processor obtains M OFS ports connected to a same conventional IP network, it is determined whether there is a logical switch corresponding to the conventional IP network, where information about the logical switch includes related information of at least one OFS port among the M OFS ports, if there is no logical switch corresponding to the conventional IP network, the information about the logical switch is created and stored, where the information about the logical switch includes related information of the M OFS ports, and related information of each OFS port includes link information in a direction from the port to the logical switch and/or link information in a direction from the logical switch to the port, and the logical switch is managed as a common OPENFLOW switch of an OPENFLOW network. This improves topological learning efficiency of an OPENFLOW network cross a conventional IP network, and simplifies management by a controller cross a networking scenario in which an OPENFLOW network and a conventional IP network are interconnected.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A topological learning method, comprising:
obtaining, by a controller, M OPENFLOW switch (OFS) ports connected to a common conventional Internet Protocol (IP) network, wherein M is an integer greater than or equal to 2, wherein the conventional IP network comprises a non-OFS, and wherein the conventional IP network does not comprise an OFS; and
storing information about a logical switch when there is no logical switch corresponding to the conventional IP network, wherein the information about the logical switch comprises related information of the M OFS ports, and wherein the related information of the M OFS ports is obtained according to the M OFS ports and the common conventional IP network, and wherein the related information of each of the M OFS ports comprises link information between the logical switch and a relative one of the M OFS ports.

2. The topological learning method according to claim 1, further comprising updating the information about the logical switch when there is the logical switch corresponding to the common conventional IP network, wherein the updated information about the logical switch comprises the related information of the M OFS ports.

3. The topological learning method according to claim 1, wherein storing the information about the logical switch comprises creating, by the controller, link information between the M OFS ports and the logical switch according to sending directions and receiving directions of the M OFS ports.

4. The topological learning method according to claim 1, wherein obtaining, by the controller, the M OFS ports connected to the common conventional IP network comprises:
controlling, by the controller, each OFS port in the OPENFLOW network to send an Link Layer Discovery Protocol (LLDP) message and a Broadcast Domain Discovery Protocol (BDDP) message, wherein the BDDP message and the LLDP message each carry an identifier of a sending port, and wherein the identifier of the sending port uniquely identifies the sending port in the OPENFLOW network; and
obtaining, by the controller, the M OFS ports connected to the common conventional IP network according to the identifier of the sending port that is carried in the BDDP message and the identifier of the sending port that is carried in the LLDP message, wherein the M OFS ports comprise a first port and M−1 second ports, wherein the first port receives BDDP messages sent by the second ports but does not receive LLDP messages sent by the second ports.

5. The topological learning method according to claim 1, wherein obtaining, by the controller, the M OFS ports connected to the common conventional IP network comprises:
controlling, by the controller, each OFS port in the OPENFLOW network to send an Link Layer Discovery Protocol (LLDP) message and a Broadcast Domain Discovery Protocol (BDDP) message, wherein the BDDP message and the LLDP message each carry an identifier of a sending port, and wherein the identifier of the sending port uniquely identifies the sending port in the OPENFLOW network; and
obtaining, by the controller, the M OFS ports connected to the common conventional IP network according to the identifier of the sending port that is carried in the BDDP message and the identifier of the sending port that is carried in the LLDP message, wherein the M OFS ports comprise a first port and M−1 second ports, wherein the M−1 second ports receive a BDDP message sent by the first port but do not receive an LLDP message sent by the first port.

6. The topological learning method according to claim 1, wherein the obtaining, by the controller, the M OFS ports connected to the common conventional IP network comprises:
enabling, by the controller, a routing protocol on a third port connected to an IP router;
storing, by the controller, a correspondence between the third port and an IP address;
learning, by the controller using the routing protocol, routing information of the IP router connected to the third port;
obtaining, by the controller from the routing information, network segment information of routers connected to the IP router;
determining, by the controller according to the correspondence between the third port and the IP address, a fourth port belonging to the network segment information;
sending, by the controller, a User Datagram Protocol (UDP) message to the fourth port through the third port, wherein the UDP message comprises a data path identifier and a port identifier of a switch that sends the UDP message; and
determining that the third port and the fourth port are ports in the M OFS ports connected to the common conventional IP network when the controller determines that the fourth port receives the UDP message sent by the third port.

7. The topological learning method according to claim 1, wherein after storing, by the controller, the information about the logical switch, the method further comprises deleting link information between a down port and the logical switch when the controller determines the down port among the M OFS ports.

8. The topological learning method according to claim 7, wherein the method further comprises deleting the information about the logical switch when the controller determines that all of the M OFS ports are down.

9. The topological learning method according to claim 1, wherein after storing, by the controller, the information about the logical switch, the method further comprises calculating, by the controller, a forwarding path according to link information between the M OFS ports and the logical switch.

10. The topological learning method according to claim 1, wherein the link information comprises link information in a direction from one of the M OFS ports to the logical switch and link information in a direction from the logical switch to the one of the M OFS ports.

11. A controller, comprising:
a memory configured to store instructions; and
a processor coupled to the memory and configured to execute the instructions to:
obtain M OPENFLOW switch (OFS) ports connected to a common conventional Internet Protocol (IP) network, wherein M is an integer greater than or equal to 2, wherein the common conventional IP network comprises a non-OFS, and wherein the common conventional IP network does not comprise an OFS; and create information about a logical switch when there is no logical switch corresponding to the common conventional IP network, wherein the information about the logical switch comprises related information of the M OFS ports, and wherein the related information of the M OFS ports is obtained according to the M OFS ports and the common conventional IP network, and the related information of each of the M OFS ports comprises link information between the logical switch and a relative one of the M OFS ports.

12. The controller according to claim 11, wherein the processor is further configured to update the information about the logical switch when there is the logical switch corresponding to the common conventional IP network, and wherein the updated information about the logical switch comprises the related information of the M OFS ports.

13. The controller according to claim 11, wherein the processor is configured to create link information between the M OFS ports and the logical switch according to sending directions and receiving directions of the M OFS ports.

14. The controller according to claim 11, wherein the processor is configured to:

control each OFS port in the OPENFLOW network to send an Link Layer Discovery Protocol (LLDP) message and a Broadcast Domain Discovery Protocol (BDDP) message, wherein the BDDP message and the LLDP message each carry an identifier of a sending port, and wherein the identifier of the sending port uniquely identifies the sending port in the OPENFLOW network; and obtain the M OFS ports connected to the common conventional IP network according to the identifier of the sending port that is carried in the BDDP message and the identifier of the sending port that is carried in the LLDP message, wherein the M OFS ports comprise a first port and M−1 second ports, wherein the first port receives BDDP messages sent by the second ports but does not receive LLDP messages sent by the second ports.

15. The controller according to claim 11, wherein the processor is configured to:

control each OFS port in the OPENFLOW network to send an Link Layer Discovery Protocol (LLDP) message and a Broadcast Domain Discovery Protocol (BDDP) message, wherein the BDDP message and the LLDP message each carry an identifier of a sending port, and wherein the identifier of the sending port uniquely identifies the sending port in the OPENFLOW network; and obtain the M OFS ports connected to the common conventional IP network according to the identifier of the sending port that is carried in the BDDP message and the identifier of the sending port that is carried in the LLDP message, wherein the M OFS ports comprise a first port and M−1 second ports, wherein the M−1 second ports receive the BDDP message sent by the first port but do not receive the LLDP message sent by the first port.

16. The controller according to claim 11, wherein the processor is configured to:

enable a routing protocol on a third port connected to an IP router, and storing a correspondence between the third port and an IP address;

learn using the routing protocol, routing information of the IP router connected to the third port;

obtain from the routing information, network segment information of routers connected to the IP router;

determine according to the correspondence between the third port and the IP address, a fourth port belonging to the network segment information;

send a User Datagram Protocol (UDP) message to the fourth port through the third port, wherein the UDP message comprises a data path identifier and a port identifier of a switch that sends the UDP message; and determine that the third port and the fourth port are ports in the M OFS ports connected to the common conventional IP network when the controller determines that the fourth port receives the UDP message sent by the third port.

17. The controller according to claim 11, wherein the processor is further configured to delete link information between a down port and the logical switch when the processor determines the down port among the M OFS ports.

18. The controller according to claim 17, wherein the processor is further configured to delete the information about the logical switch when the processor determines that all of the M OFS ports are down.

19. The controller according to claim 11, wherein the processor is further configured to calculate a forwarding path according to the link information between the M OFS ports and the logical switch.

20. The controller according to claim 11, wherein the link information comprises link information in a direction from one of the M OFS ports to the logical switch and link information in a direction from the logical switch to the one of the M OFS ports.

* * * * *